(12) United States Patent
Krych et al.

(10) Patent No.: US 11,904,972 B2
(45) Date of Patent: Feb. 20, 2024

(54) HEIGHT DETECTION SYSTEM OF A MOTORCYCLE

(71) Applicant: Bayerische Motoren Werke Aktiengesellschaft, Munich (DE)

(72) Inventors: Tim Krych, Munich (DE); Martin Pazulla, Wolfratshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 634 days.

(21) Appl. No.: 17/054,733

(22) PCT Filed: Jul. 3, 2019

(86) PCT No.: PCT/EP2019/067830
§ 371 (c)(1),
(2) Date: Nov. 11, 2020

(87) PCT Pub. No.: WO2020/038637
PCT Pub. Date: Feb. 27, 2020

(65) Prior Publication Data
US 2021/0245828 A1    Aug. 12, 2021

(30) Foreign Application Priority Data

Aug. 21, 2018   (DE) ................. 10 2018 214 042.1

(51) Int. Cl.
*G01B 7/14*       (2006.01)
*B62J 45/41*      (2020.01)
(Continued)

(52) U.S. Cl.
CPC ............. *B62J 45/41* (2020.02); *B62J 45/42* (2020.02); *B62K 25/283* (2013.01);
(Continued)

(58) Field of Classification Search
CPC .......... B62J 45/41; B62J 45/42; B62K 25/04; B62K 25/28; B62K 11/02; B62K 11/04; G01B 7/14; G01B 7/20
See application file for complete search history.

(56) References Cited

U.S. PATENT DOCUMENTS

| | | | |
|---|---|---|---|
| 2016/0096582 A1* | 4/2016 | Kawai | B62K 25/04 180/227 |
| 2017/0274721 A1 | 9/2017 | Kasuga et al. | |
| 2019/0202514 A1* | 7/2019 | Matsushima | B29C 70/68 |

FOREIGN PATENT DOCUMENTS

| | | |
|---|---|---|
| CN | 107444551 A | 12/2017 |
| DE | 197 33 719 C1 | 4/1999 |

(Continued)

OTHER PUBLICATIONS

Chinese-language Office Action issued in Chinese Application No. 201980032890.5 dated Sep. 2, 2021 with English translation (15 pages).

(Continued)

*Primary Examiner* — Neel D Shah
(74) *Attorney, Agent, or Firm* — Crowell & Moring LLP

(57) ABSTRACT

A height detection system of a motorcycle for determining a load-dependent height of a rear carrier part in relation to a rear wheel swing arm of the motorcycle includes a measuring device connecting the rear carrier part and the rear wheel swing arm for measuring the distance between the rear carrier part and the rear wheel swing arm, and a fastening web formed integrally and protruding from the rear carrier part in the direction of the rear wheel swing arm. The fastening web includes a lateral bearing face configured to receive a rear carrier end of the measuring device.

20 Claims, 2 Drawing Sheets

(51) Int. Cl.
*B62J 45/42* (2020.01)
*B62K 25/28* (2006.01)
*B62J 6/025* (2020.01)

(52) U.S. Cl.
CPC .............. *B62K 25/286* (2013.01); *G01B 7/14* (2013.01); *B62J 6/025* (2020.02)

(56) References Cited

FOREIGN PATENT DOCUMENTS

| | | |
|---|---|---|
| DE | 11 2008 002 238 T5 | 6/2010 |
| DE | 10 2014 209 164 A1 | 11/2015 |
| EP | 2 202 140 A1 | 6/2010 |
| JP | 57155107 * 5/1982 | ........... B62K 25/283 |
| JP | 57-155107 A | 9/1982 |
| JP | 5-246372 A | 9/1993 |
| JP | 2010-155479 A | 7/2010 |
| JP | 2013-136330 A | 7/2013 |
| JP | 2017-105271 A | 6/2017 |

OTHER PUBLICATIONS

International Search Report (PCT/ISA/210) issued in PCT Application No. PCT/EP2019/067830 dated Oct. 8, 2019 with English translation (six (6) pages).
German-language Written Opinion (PCT/ISA/237) issued in PCT Application No. PCT/EP2019/067830 dated Oct. 8, 2019 (five (5) pages).
German-language Search Report issued in German Application No. 10 2018 214 042.1 dated Apr. 26, 2019 with partial English translation (12 pages).

* cited by examiner

HEIGHT DETECTION SYSTEM OF A MOTORCYCLE

BACKGROUND AND SUMMARY OF THE INVENTION

The present invention concerns a height detection system of a motorcycle for determining a load-dependent height of a rear carrier part relative to a rear wheel swing arm of the motorcycle.

Different loads from one or two persons, with or without luggage, have great effects on the riding properties of a motorcycle. In order to give modern motorcycle control systems information on the current motorcycle load, e.g. for suspension or headlamp alignment, motorcycles have a height detection system. In the prior art, the deflection of the rear carrier part relative to the rear wheel swing arm is measured in order to detect the height. The height detection system here comprises a pushrod, a deflector lever, a potentiometer and a separate metal bracket for mounting the height detection device on the rear carrier part.

The disadvantage with this system structure is that to accommodate the height detection system, two separate components are required so as to mount this on the rear carrier part, and hence the mounting complexity is very high due to the multiplicity of components. Furthermore, the component multiplicity influences the logistics complexity in motorcycle assembly and requires additional storage space.

It is therefore an object of the present invention to overcome the abovementioned disadvantages and provide a height detection system of a motorcycle for determining a load-dependent height of a rear carrier part relative to a rear wheel swing arm of the motorcycle, which reduces the mounting complexity and minimizes the number of components and the tools required for this.

According to the invention, a height detection system of a motorcycle is proposed for determining a load-dependent height of a rear carrier part relative to a rear wheel swing arm of the motorcycle, which comprises a measuring device connecting the rear carrier part and the rear wheel swing arm for measuring the distance between the rear carrier part and the rear wheel swing arm. Here, a fastening web is formed integrally on the rear carrier part. The fastening web protrudes from the rear carrier part in the direction of the rear wheel swing arm and forms a lateral bearing face for the measuring device. As a result, the measuring device may be attached directly to the fastening web of the rear carrier part. Accordingly, a fastening component, e.g. a separate metal bracket for mounting the measuring device on the rear carrier part, is superfluous and may be omitted. Furthermore, the lateral bearing face offers an advantageous fixing point matched to the measuring device. Because of the protruding extent in the direction of the rear wheel swing arm, the mounting complexity is optimized and the calibration of the measuring device is simplified.

In an advantageous embodiment, it is provided that the lateral bearing face of the fastening web runs parallel to the plane of the longitudinal extent and vertical extent of the rear carrier part. Since the motorcycle is sprung vertically in this plane, and hence the deflection of the measuring device takes place in this plane, the lateral bearing face running parallel thereto is optimally configured for attachment of the measuring device. Thus the geometric design of the measuring device and calibration of the height detection system are simplified. Furthermore, the orientation of the bearing face is favorable since it lies in a plane in which the deflection and loading of the fastening web occur. Since the stiffness of the fastening web is optimal in this plane, this promotes the useful life of the height detection system and reduces the maintenance cost.

Preferably, a plurality of stiffening ribs is formed on the fastening web, wherein the ribs extend from a base profile of the rear carrier part along the lateral bearing face. The base profile is defined as an end region of the vertical extent of the rear carrier part in the direction of the rear wheel swing arm.

In one exemplary embodiment of the invention, it is provided that a first stiffening rib transforms from the base profile of the rear carrier part into an outer contour of the fastening web.

Stiffening ribs further increase the stiffness of the fastening web in the plane of its deflection and loading. They also optimize the component strength of the fastening web against loads in a transverse direction which run orthogonally to the plane of deflection.

Furthermore, a design is favorable in which each stiffening rib has a differently angled orientation relative to a perpendicular of the vertical extent of the rear carrier part, which further improves the stiffness of the fastening web.

In a further advantageous variant, at least one step is formed on the fastening web in the region of the lateral bearing face, and the profile thickness tapers from the base profile of the rear carrier part in the direction of the rear wheel swing arm. It is favorable here that a fixing for the measuring device is formed at the step with the lowest profile thickness. The adjacent step provides a further bearing face for the measuring device, against which it can be placed during mounting. Furthermore, the measuring device is arranged at the adjacent step such that the latter covers the measuring device at the fixing point in the direction of travel. Thus the adjacent step protects the fixing point of the measuring device from soiling and extends the service life.

It is furthermore advantageous if, in the region of the smallest cross-section of the fastening web, a step has a semicircular arcuate form. It is advantageous here that the arcuate form is precisely adapted to the measuring device. Thus the step offers an optimal bearing point for mounting. Also, in this way the fastening web is adapted to the deflection and loading of the measuring device during travel.

In a preferred embodiment of the invention, the fastening web is formed flat and fin-like. The flat fin-like geometry offers a best possible compromise between stiffness, use of materials and space while being adapted the needs and loading of the fastening web.

In a refinement of the present height detection system, it is furthermore provided that the measuring device comprises a pushrod, a deflector lever and a potentiometer which are arranged such that the pushrod and the deflector lever connect the rear wheel swing arm to the fastening web and are rotatably mounted, and the potentiometer is arranged for measuring the deflection at the fastening web and the deflector lever. The movement of the rear carrier part relative to the rear wheel swing arm causes the pushrod to rotate the deflector lever at the fastening web, and the potentiometer measures the rotation of the deflector lever. Detection of the height is thus guaranteed with a reduced number of components since functions of omitted components are integrated. The mounting complexity is lessened and at the same time the number of tools necessary for mounting the height detection system is reduced.

Preferably, the height detection system is configured such that the measuring device emits an electrical output signal.

It is advantageous that an electrical output signal is sent to a control unit and may thus be processed further by an on-board computer.

In a preferred embodiment of the invention, the rear carrier part and fastening web are formed integrally from plastic.

Furthermore, an embodiment variant is favorable in which the measuring device of the height detection system on the rear wheel swing arm lies in the same plane as the lateral bearing face of the fastening web. In this way, the deflection of the height detection system takes place only in the same plane as the deflection between the rear carrier part and rear wheel swing arm. This is favorable for determining the height since only deflections in this plane need be taken into account, and thus the calculation complexity is simplified.

Other advantageous refinements of the invention are characterized in the subclaims or are described in more detail below, together with the description of the preferred embodiment of the invention with reference to the figures.

DETAILED DESCRIPTION OF THE DRAWINGS

The invention is described below with reference to FIGS. 1 and 2 which show an exemplary embodiment, wherein the same reference signs refer to the same structural and/or functional features.

Figure 1:
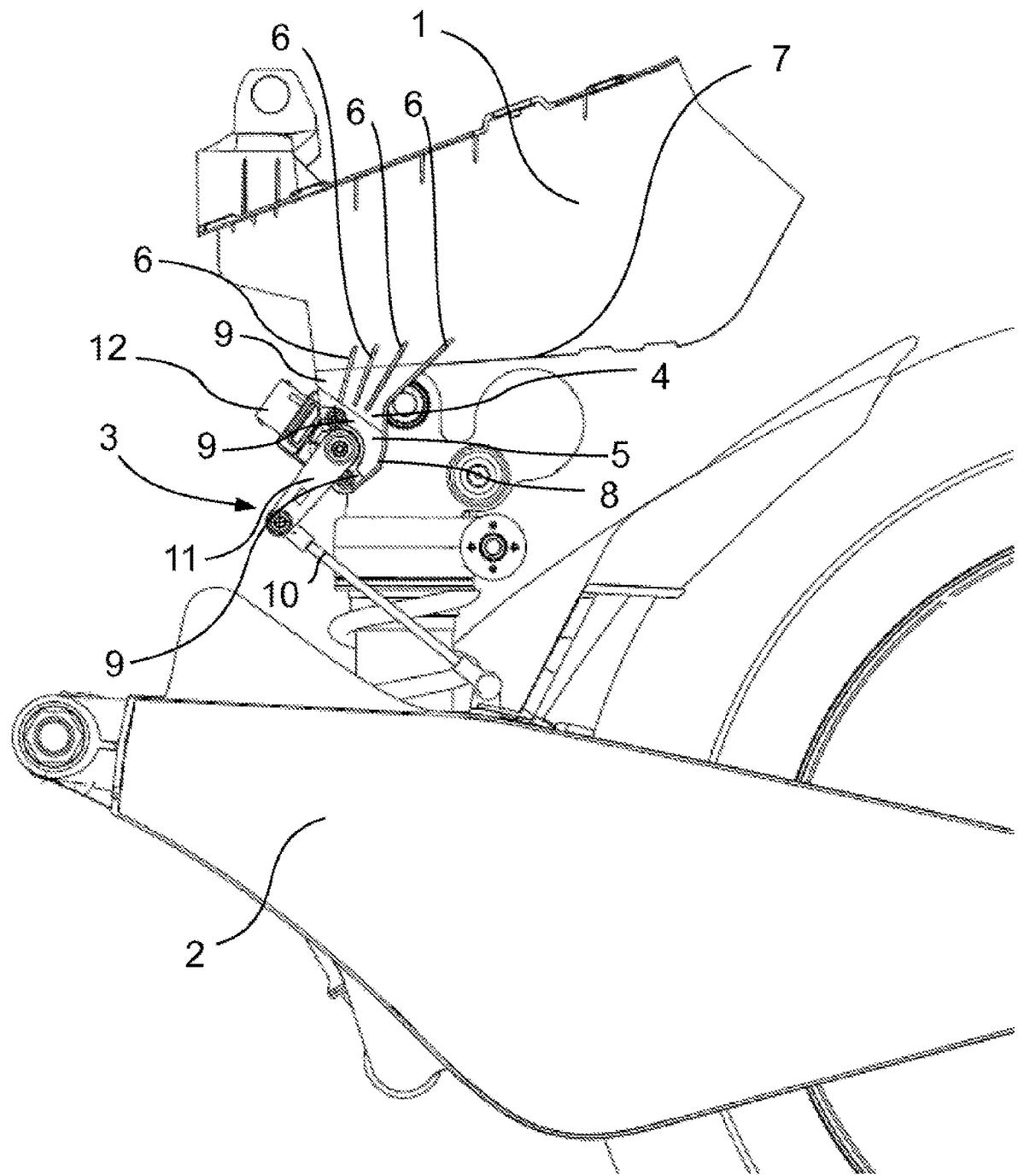
FIG. 1 a side view of a height detection system of a motorcycle for determining a load-dependent height of a rear carrier part relative to a rear wheel swing arm of the motorcycle in accordance with an embodiment of the present invention, FIG. 2 a rear view of the height detection system from FIG. 1.

FIG. 1 shows a side view of a height detection system of a motorcycle for determining a load-dependent height of a rear carrier part 1 relative to a rear wheel swing arm 2 of the motorcycle. FIG. 1 shows a measuring device 3 which connects the rear carrier part 1 and the rear wheel swing arm 2. Furthermore, a fastening web 4 is formed integrally on the rear carrier part 1. The fastening web 4 protrudes from the rear carrier part 1 in the direction of the rear wheel swing arm 2, and is formed flat in the manner of a fin. This forms a lateral bearing face 5 for the measuring device 3. The lateral bearing face 5 lies in the plane of the longitudinal extent and vertical extent of the rear carrier part 1. The outer contour of the fastening web 4 in this plane rectilinearly extends a front outer edge of the base profile 7 of the rear carrier part 1. Furthermore, in this plane the fastening web 4 forms a rounded end in the direction of the rear wheel swing arm 2, and then runs in an S-shape back to the base profile 7 of the rear carrier part 1. Four stiffening ribs 6 extend from the base profile 7 of the rear carrier part 1 along the lateral bearing face 5. A first stiffening rib 6 transforms from the base profile 7 of the rear carrier part 1 into the outer contour 8 of the fastening web 4, and in this region forms a reinforced outer contour 8 which runs up to the rounded end in the direction of the rear wheel swing arm 2. Furthermore, three stiffening ribs 6 extend spaced apart from each other over the lateral bearing face 5. The stiffening ribs 6 have a different angular orientation relative to a perpendicular of the vertical extent of the rear carrier part 1. The angle between the stiffening ribs 6 and the perpendicular vertical extent of the rear carrier part 1 becomes more acute from the first stiffening rib 6 to the adjacent stiffening ribs 6. Three steps 9 are formed in the region of the lateral bearing face 5, and the profile thickness tapers from the base profile 7 of the rear carrier part 1 in the direction of the rear wheel swing arm 2. The stiffening ribs 6 here extend only over the step 9 with the greatest profile thickness. In the region of the smallest profile thickness, the adjacent step 9 has an arcuate form which is adapted to the geometry of the measuring device 3.

The measuring device 3 in FIG. 1 comprises a pushrod 10, a deflector lever 11 and a potentiometer 12. The deflector lever 11 is arranged centrally on the step 9 with the smallest profile thickness, between two fixing bores for the potentiometer 12. The arcuate step 9 here runs adjacent to and along the rounded deflector lever 11. The pushrod 10 and the deflector lever 11 connect the rear wheel swing arm 2 to the fastening web 4. The potentiometer 12 for measuring the height is arranged at the fastening web 6 so as to register the deflection of the deflector lever 11.

Figure 2:
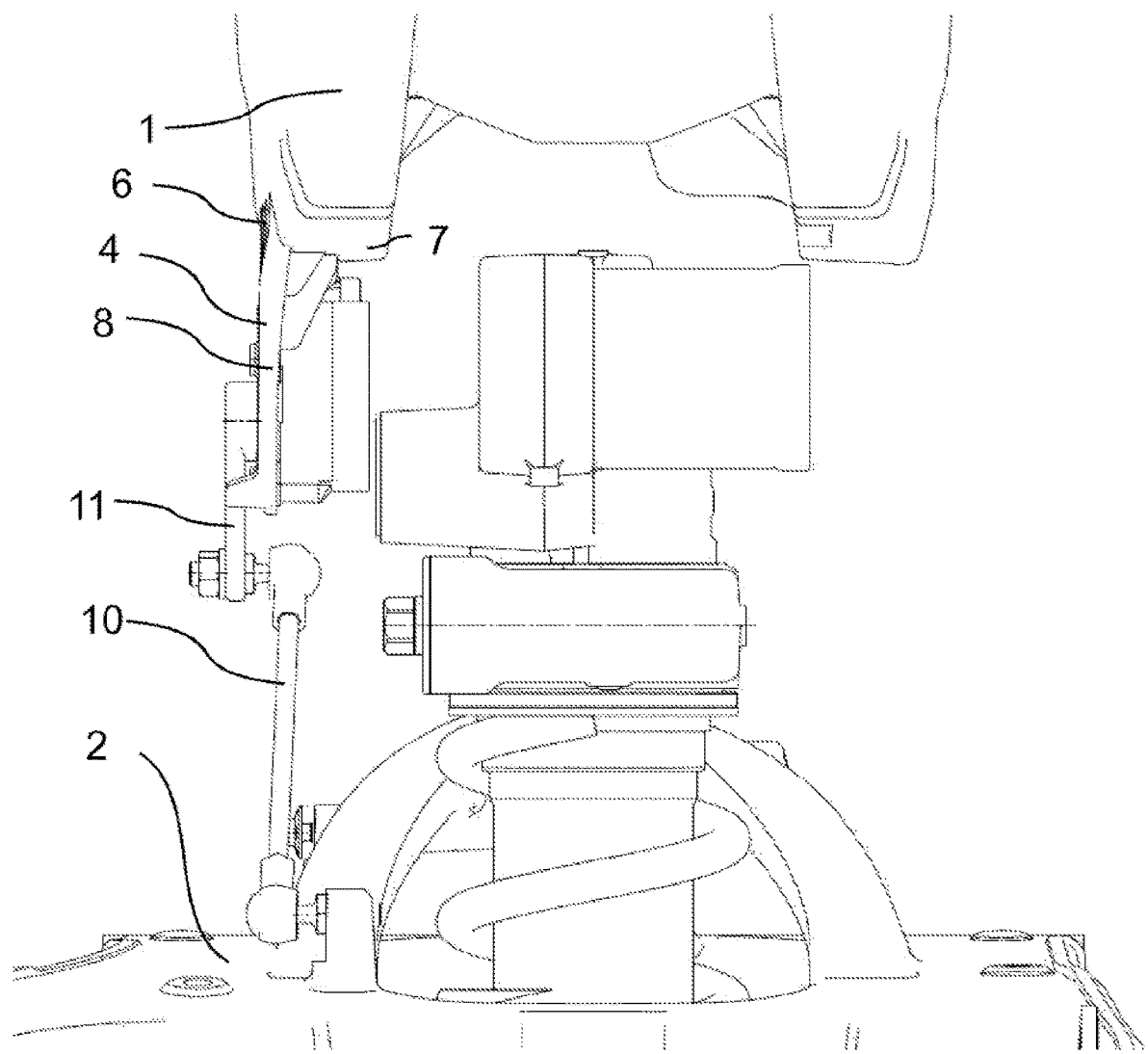

FIG. 2 shows a rear view of the height detection system from FIG. 1 which is arranged as described above and attached to the fastening web 4.

What is claimed is:

1. A height detection system of a motorcycle for determining a load-dependent height of a rear wheel swing arm of the motorcycle, comprising:
    a rear carrier part; and
    a measuring device connecting the rear carrier part and the rear wheel swing arm, the measuring device being configured to measure a distance between the rear carrier part and the rear wheel swing arm, wherein
        the rear carrier includes an integrally-formed fastening web arranged to protrude from the rear carrier part in a direction of the rear wheel swing arm, and
        the fastening web includes a lateral bearing face configured to receive at least a portion of the measuring device.

2. The height detection system according to claim 1, wherein
    the rear carrier part and the fastening web are integrally formed from plastic.

3. The height detection system according to claim 1, wherein
    the lateral bearing face of the fastening web runs parallel to a plane of a longitudinal extent and a vertical extent of the rear carrier part.

4. The height detection system according to claim 3, wherein
    a plurality of stiffening ribs is formed on the fastening web, wherein the ribs extend from a base profile of the rear carrier part along at least a portion of the lateral bearing face.

5. The height detection system according to claim 4, wherein
    a first stiffening rib of the plurality of stiffening ribs extends from the base profile of the rear carrier part into an outer contour of the fastening web.

6. The height detection system according to claim 4, wherein
    each stiffening rib of the plurality of stiffening ribs has a differently angled orientation relative to a perpendicular of the vertical extent of the rear carrier part.

7. The height detection system according to claim 6, wherein
    at least one step is formed on the fastening web in the lateral bearing face.

8. The height detection system according to claim 3, wherein
at least one step is formed on the fastening web in the lateral bearing face.

9. The height detection system according to claim 1, wherein
the fastening web is flat and protrudes from the rear carrier part a fin shape.

10. The height detection system according to claim 1, wherein the measuring device includes
a pushrod,
a deflector lever, and
a potentiometer, and
the pushrod and the deflector lever are configured to connect the rear wheel swing arm to the fastening web and are rotatably mounted, and
the potentiometer is arranged to measure a deflection of the deflector lever relative to the fastening web.

11. The height detection system according to claim 10, wherein
the potentiometer is configured to emit an electrical output signal corresponding to the deflection when the rear wheel swing arm height relative to the fastening web changes.

12. The height detection system according to claim 11, wherein
a connection point of the measuring device on the rear wheel swing arm is arranged in the same vertical plane as the lateral bearing face of the fastening web.

13. A height detection system of a motorcycle for determining a load-dependent height of a rear wheel swing arm of the motorcycle, comprising:
a rear carrier part; and
a measuring device connecting the rear carrier part and the rear wheel swing arm, the measuring device being configured to measure a distance between the rear carrier part and the rear wheel swing arm, wherein
the rear carrier includes an integrally-formed fastening web arranged to protrude from the rear carrier part in a direction of the rear wheel swing arm, and
the fastening web includes a lateral bearing face configured to receive and rotatably mounted to at least a portion of the measuring device.

14. The height detection system according to claim 13, wherein
a plurality of stiffening ribs is formed on the fastening web, wherein the ribs extend from a base profile of the rear carrier part along at least a portion of the lateral bearing face.

15. The height detection system according to claim 14, wherein
a first stiffening rib of the plurality of stiffening ribs extends from the base profile of the rear carrier part into an outer contour of the fastening web.

16. The height detection system according to claim 14, wherein
each stiffening rib of the plurality of stiffening ribs has a differently angled orientation relative to a perpendicular of the vertical extent of the rear carrier part.

17. The height detection system according to claim 13, wherein
at least one step is formed on the fastening web in the lateral bearing face.

18. The height detection system according to claim 13, wherein
the fastening web is flat and protrudes from the rear carrier part a fin shape.

19. The height detection system according to claim 13, wherein the measuring device includes
a pushrod,
a deflector lever, and
a potentiometer, and
the pushrod and the deflector lever are configured to connect the rear wheel swing arm to the fastening web and are rotatably mounted, and
the potentiometer is arranged to measure a deflection of the deflector lever relative to the fastening web.

20. The height detection system according to claim 13, wherein
a connection point of the measuring device on the rear wheel swing arm is arranged in the same vertical plane as the lateral bearing face of the fastening web.

* * * * *